US010642875B2

(12) United States Patent
Bull et al.

(10) Patent No.: US 10,642,875 B2
(45) Date of Patent: May 5, 2020

(54) ACCURATE RELATIONSHIP EXTRACTION WITH WORD EMBEDDINGS USING MINIMAL TRAINING DATA

(71) Applicant: INTERNATIONAL BUSINESS MACHINES CORPORATION, Armonk, NY (US)

(72) Inventors: Brendan Bull, Durham, NC (US); Paul Lewis Felt, Springville, UT (US)

(73) Assignee: International Business Machines Corporation, Armonk, NY (US)

( * ) Notice: Subject to any disclaimer, the term of this patent is extended or adjusted under 35 U.S.C. 154(b) by 357 days.

(21) Appl. No.: 15/581,339

(22) Filed: Apr. 28, 2017

(65) Prior Publication Data

US 2018/0314703 A1   Nov. 1, 2018

(51) Int. Cl.
*G06F 16/338* (2019.01)
*G06F 16/33* (2019.01)
*G06F 17/27* (2006.01)
*G06F 16/332* (2019.01)

(52) U.S. Cl.
CPC ........ *G06F 16/3347* (2019.01); *G06F 16/338* (2019.01); *G06F 16/3329* (2019.01); *G06F 17/277* (2013.01); *G06F 17/2715* (2013.01); *G06F 17/2785* (2013.01)

(58) Field of Classification Search
None
See application file for complete search history.

(56) References Cited

U.S. PATENT DOCUMENTS

| 8,874,432 | B2 | 10/2014 | Qi et al. | |
| 9,430,563 | B2* | 8/2016 | Clinchant | G06K 9/4676 |
| 9,477,963 | B2 | 10/2016 | Kar et al. | |
| 2003/0154181 | A1 | 8/2003 | Liu et al. | |
| 2015/0331929 | A1* | 11/2015 | El-Saban | G06F 16/50 707/739 |
| 2017/0011289 | A1* | 1/2017 | Gao | G06N 3/0472 |

OTHER PUBLICATIONS

Asuncion, A., On Smoothing and Inference for Topic Models, UAI 2009, pp. 27-34. (Year: 2009).*

(Continued)

*Primary Examiner* — Cheyne D Ly
(74) *Attorney, Agent, or Firm* — Dmitry Paskalov (57) ABSTRACT

A processor-implemented method generates a plurality of smoothed transition vectors from a plurality of training data. The method receives a plurality of text and a query. The method converts the plurality of received text to a word embedding space. The method converts the received query to a set of coordinates from the word embedding space and a set of the plurality of determined smoothed transition vectors. The method determines a plurality of candidate answers based on adding the set of the smoothed transition vectors to the set of coordinates in the word embedding space. The method determines an answer to the received query, based on applying a filter, wherein the filter is selected from a group consisting of a type filtering, a conflicting type filtering, and an equivalence filtering, and the method displays the determined answer.

17 Claims, 8 Drawing Sheets

(56) References Cited

OTHER PUBLICATIONS

Mell et al., "The NIST Definition of Cloud Computing," National Institute of Standards and Technology, U.S. Department of Commerce, Special Publication 800-145, Sep. 2011, pp. 1-7.

Miñarro-Giménez et al., "Applying deep learning techniques on medical corpora from the World Wide Web: a prototypical system and evaluation", CoRR, vol. abs/1502.03682, Feb. 2015, pp. 1-14.

Neelakantan et al., "Efficient Non-parametric Estimation of Multiple Embeddings per Word in Vector Space", In Conference on Empirical Methods in Natural Language Processing, 2014, arXiv:1504.06654v1 [cs.CL], Apr. 24, 2015, pp. 1-12.

Fu et al., "Learning Semantic Hierarchies viaWord Embeddings", Research Center for Social Computing and Information Retrieval, Harbin Institute of Technology, China, Baidu Inc., Beijing, China, Proceedings of the 52nd Annual Meeting of the Association for Computational Linguistics, pp. 1199-1209, Baltimore, Maryland, USA, Jun. 23-25, 2014, c 2014 Association for Computational Linguistics.

Singh, "Discovering Lexical Classes and Syntax: (Report with Annotated Bibliography)", Apr. 7, 2014, pp. 1-10.

Boyd-Graber et al., "Syntactic Topic Models", © 2006 Association for Computational Linguistics, Computation and Language (cs.CL); Artificial Intelligence (cs.AI); Statistics Theory (math.ST), arXiv:1002.4665v1 [cs.CL], Feb. 25, 2010, pp. 1-26.

Li et al., "Semi-Supervised Sequence Modeling with Syntactic Topic Models", Computer Science Department University of Massachusetts Amherst, Copyright 2005, American Association for Artificial Intelligence, www.aaai.org, All rights reserved, pp. 1-6.

Darling et al., "Probabilistic Topic and Syntax Modeling with Part-of-Speech LDA", © 2005 Association for Computational Linguistics, arXiv:1303.2826v1 [cs.CL] Mar. 12, 2013, pp. 1-24.

IBM: List of IBM Patents or Patent Applications Treated As Related (Appendix P), Mar. 20, 2018, pp. 1-2.

* cited by examiner

ACCURATE RELATIONSHIP EXTRACTION WITH WORD EMBEDDINGS USING MINIMAL TRAINING DATA

BACKGROUND

The present invention relates, generally, to the field of computing, and more particularly to natural language processing by word relationship extractions using word embedding.

Natural language processing (NLP) is a field of computer science, artificial intelligence, and computational linguistics related to the interactions between computers and human natural languages such as programming computers to process large natural language corpora. Word embedding is typically a collective name for a set of language modeling and feature learning techniques in NLP where words or phrases from a text are mapped to vectors or a set of coordinates of real numbers.

SUMMARY

According to one embodiment, a method, computer system, and computer program product for answering a targeted question based on word embedding relationship extraction is provided. The present invention may include a processor-implemented method for word embedding relationship extraction. The method generates a plurality of smoothed transition vectors from a plurality of training data. The method receives a plurality of text and a query. The method converts the plurality of received text to a word embedding space. The method converts the received query to a set of coordinates from the word embedding space and a set of the plurality of determined smoothed transition vectors. The method determines a plurality of candidate answers based on adding the set of the smoothed transition vectors to the set of coordinates in the word embedding space. The method determines an answer to the received query, based on applying a filter, wherein the filter is selected from a group consisting of a type filtering, a conflicting type filtering, and an equivalence filtering, and the method displays the determined answer.

BRIEF DESCRIPTION OF THE SEVERAL VIEWS OF THE DRAWINGS

These and other objects, features and advantages of the present invention will become apparent from the following detailed description of illustrative embodiments thereof, which is to be read in connection with the accompanying drawings. The various features of the drawings are not to scale as the illustrations are for clarity in facilitating one skilled in the art in understanding the invention in conjunction with the detailed description. In the drawings.

DETAILED DESCRIPTION

Detailed embodiments of the claimed structures and methods are disclosed herein; however, it may be understood that the disclosed embodiments are merely illustrative of the claimed structures and methods that may be embodied in various forms. This invention may, however, be embodied in many different forms and should not be construed as limited to the exemplary embodiments set forth herein. In the description, details of well-known features and techniques may be omitted to avoid unnecessarily obscuring the presented embodiments.

Embodiments of the present invention relate to the field of computing, and more particularly to word relationship extractions using word embedding. The following described exemplary embodiments provide a system, method, and program product to, among other things, extract relationships between words using word embedding in order to answer a targeted question. Therefore, the present embodiment has the capacity to improve the technical field of word relationship extractions using word embedding by lessening of an overhead and training period due to a lessening of extensive testing. As described below, the lessening of the overhead and the training period may be achieved through the application of smoothed transition vectors and removing incorrect candidate answers by applying filters instead of using of neural networks or Bayesian inference models that are coupled with overhead due to extensive training data before providing correct answers.

As previously described, word embedding is typically a collective name for a set of language modeling and feature learning techniques in Natural Language Processing (NLP) where words or phrases from the vocabulary are mapped to vectors or coordinates of real numbers.

Typically, answering targeted questions by using word embedding techniques provides reliable results only when word relationships are simple and linear, such as categorizing semantic similarities. However, for complex word relationships, such as answering a targeted question, only word embedding techniques that include additional elements, such as neural networks or Bayesian inference models, may provide correct answers.

A neural network is a computational model in computer science that is based on a collection of neural units. Each neural unit is an artificial neuron that may be connected with other neural units to create a neural network. The neural network may be trained to find a solution to a problem where a traditional computer program fails, such as NLP of a text or word embedding. Typically, in order to increase the accuracy of the neural network results, extensive training data is required before the neural network provides correct answers.

Bayesian inference models are based on a method of statistical inference of a probability where the Bayes theorem is used to update the probability each time a related information becomes available. As with neural networks, extensive training data is required for the Bayesian inference models to provide correct answers.

As such, it may be advantageous, among other things, to develop a mechanism for answering targeted questions by relationship extractions using limited training data. In various example embodiments described below, an answer to a variety of targeted questions may be achieved with precision without usage of additional neural networks or Bayesian inference models by applying a triangulation technique to adjust transitional vectors in the word embedding space and the use of filters to eliminate incorrect candidate answers.

According to one embodiment, a computer may determine smoothed transition vectors from training data by converting the training data to a word embedding space using a word embedding technique and deriving the smoothed transition vectors from the training sets. The computer may receive a text and convert the text to a word embedding space by the same technique that was applied to the training data. The computer may receive a query and convert the query to a set of coordinates (starting point) in the word embedding space of the text, and as to the starting point the set of the smoothed transition vectors to generate candidate answers. The computer may update the candidate answers by triangulating the set of the smoothed transition vectors in the word embedding space. The computer may determine and display an answer to the targeted question, after using a group of filters to remove incorrect candidate answers, such as by applying a type filter, a conflicting type filter, and an equivalence filter to the candidate answers.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium may be a tangible device that may retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein may be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, may be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that may direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a processor-implemented method, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, may be implemented by special purpose hardware-based systems that perform the specified functions or acts or carry out combinations of special purpose hardware and computer instructions.

The following described exemplary embodiments provide a system, method, and program product to create a model that derives smoothed transition vectors from training data and then uses the derived transition vectors to determine and display an answer to a targeted question.

Figure 1:
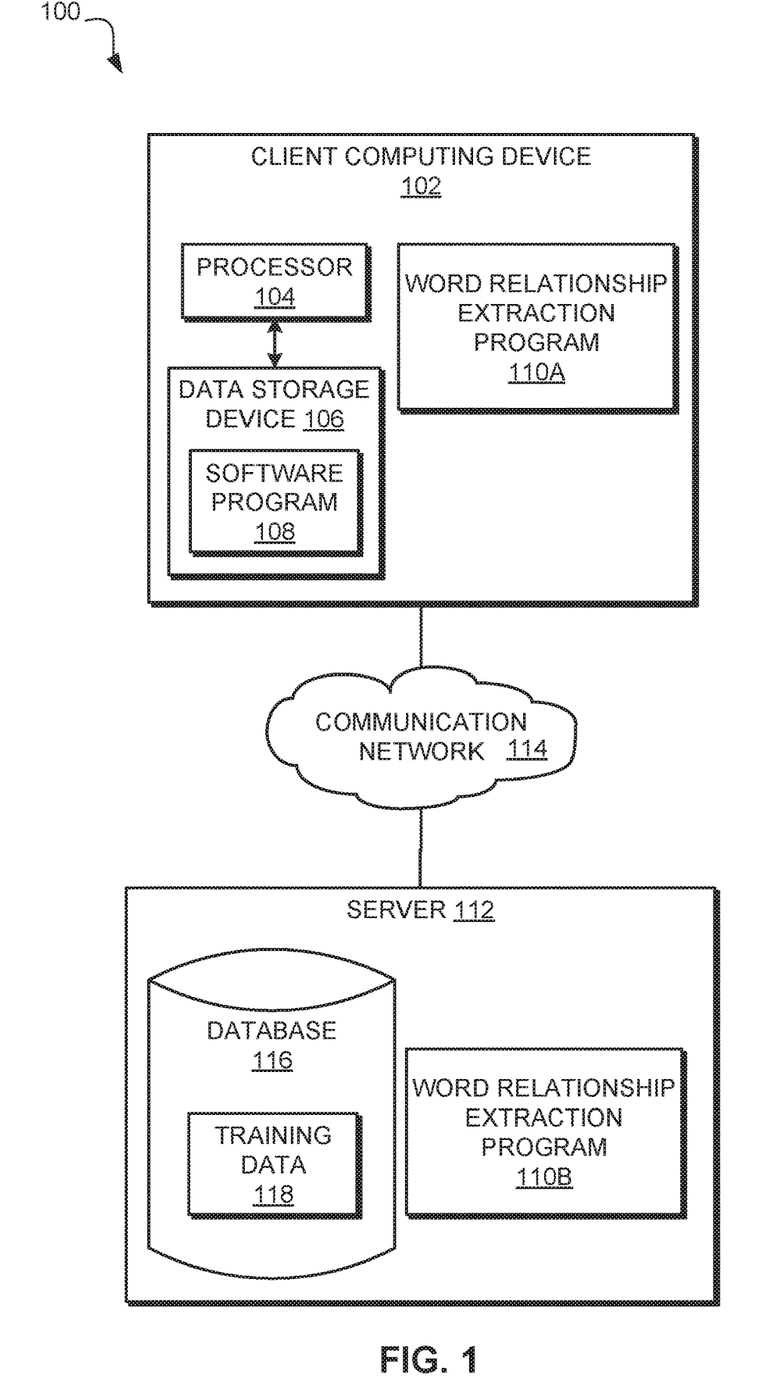
FIG. 1 illustrates an exemplary networked computer environment according to at least one embodiment.

Referring to FIG. 1, an exemplary networked computer environment 100 is depicted, according to at least one embodiment. The networked computer environment 100 may include client computing device 102 and a server 112 interconnected via a communication network 114. According to at least one implementation, the networked computer environment 100 may include a plurality of client computing devices 102 and servers 112, of which only one of each is shown for illustrative brevity.

The communication network 114 may include various types of communication networks, such as a wide area network (WAN), local area network (LAN), a telecommunication network, a wireless network, a public switched network and/or a satellite network. The communication network 114 may include connections, such as wire, wireless communication links, or fiber optic cables. It may be appreciated that FIG. 1 provides only an illustration of one implementation and does not imply any limitations with regard to the environments in which different embodiments may be implemented. Many modifications to the depicted environments may be made based on design and implementation requirements.

Client computing device 102 may include a processor 104 and a data storage device 106 that is enabled to host and run a software program 108 and a word relationship extraction program 110A and communicate with the server 112 via the communication network 114, in accordance with one embodiment of the invention. Client computing device 102 may be, for example, a mobile device, a telephone, a personal digital assistant, a netbook, a laptop computer, a tablet computer, a desktop computer, or any type of computing device capable of running a program and accessing a network. As will be discussed with reference to FIG. 3, the client computing device 102 may include internal components 302 a,b and external components 304 a,b, respectively.

The server computer 112 may be a laptop computer, netbook computer, personal computer (PC), a desktop computer, or any programmable electronic device or any network of programmable electronic devices capable of hosting and running a word relationship extraction program 110B and a database 116 and communicating with the client computing device 102 via the communication network 114, in accordance with embodiments of the invention. As will be discussed with reference to FIG. 3, the server computer 112 may include internal components 302 a,b and external components 304 a,b respectively. The server 112 may also operate in a cloud computing service model, such as Software as a Service (SaaS), Platform as a Service (PaaS), or Infrastructure as a Service (IaaS). The server 112 may also be located in a cloud computing deployment model, such as a private cloud, community cloud, public cloud, or hybrid cloud.

Database 116 may be a data repository capable of storing information, such as training data 118. Training data 118 may be a table, matrix or spreadsheet of a set of words capable of being transformed to a set of transition vectors. According to the present embodiment, training data 118 may include one or more sets of information where each set is related to different part of multi-part analogies. For example, a set of analogies of the form $a_1: a_2: \ldots : a_p$, such as: "heart:heart attack:bypass"; "skin:eczema:phototherapy"; "kidney:renal failure:dialysis". For simplicity, a three-part analogy is used in the examples below. In addition, training data 118 may include additional table that contains equivalent expressions to each word used by the training data, for example, "skin" may be included in equivalence table together with words such as "epidermis", "surface", "derma", "dermis", etc. In another embodiment, training data 118 may be located on data storage device 106 or loaded using internal components 302 a,b or external components 304 a,b.

According to the present embodiment, the word relationship extraction program 110A, 110B may be a program capable of loading training data 118 from database 116, converting the training data 118 to smoothed transition vectors, using the smoothed transition vectors to determine candidate answers to a targeted question, and determine an answer after applying filters to the candidate answers. The training data vectorization using word embedding process is explained in further detail below with respect to FIG. 2A.

Figure 2A:
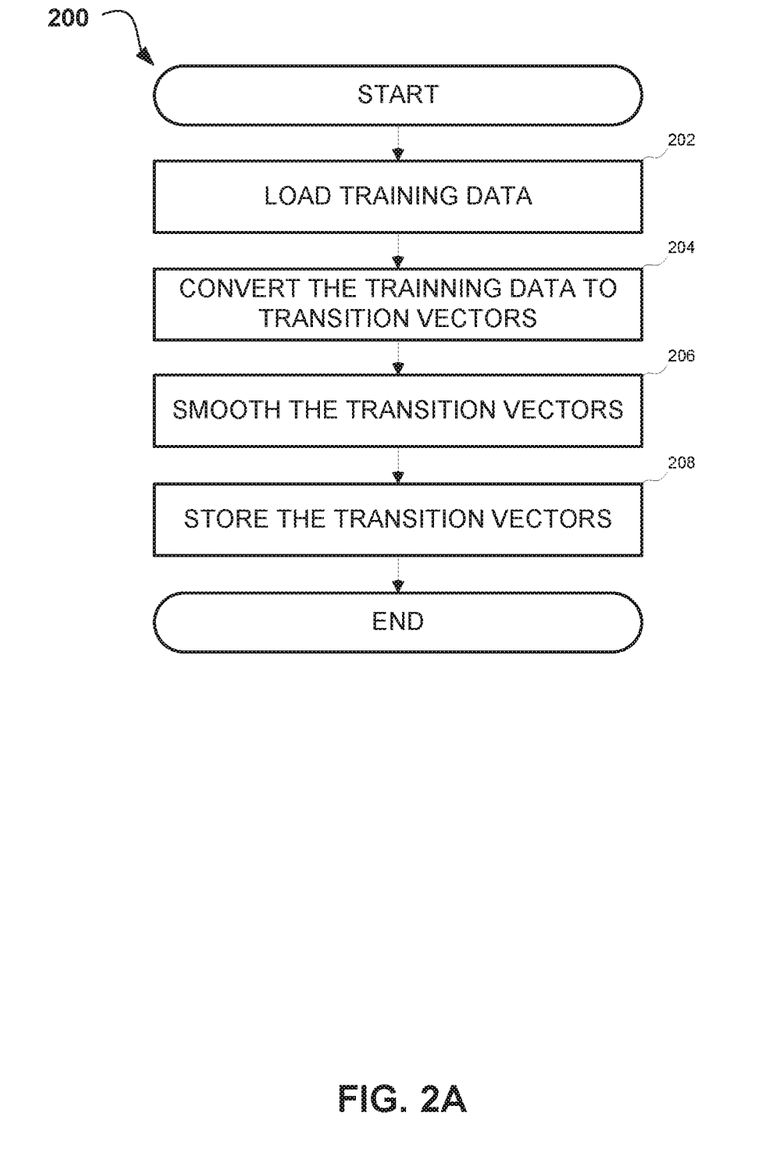
FIG. 2A is an operational flowchart illustrating training data vectorization using word embedding process according to at least one embodiment.

Referring now to FIG. 2A, an operational flowchart illustrating training data processing to determine smoothed transition vectors based on training data vectorization using word embedding process 200 is depicted according to at least one embodiment. At 202, the word relationship extraction program 110A, 110B loads training data. According to the present embodiment, the word relationship extraction program 110A, 110B may load training data 118 from a data repository, such as database 118. For example, word relationship extraction program 110A, 110B may load training data 118 and arrange the loaded training data into a table where each line represent a set of multi part analogies, such as "heart:heart attack:bypass".

Next, at 204, word relationship extraction program 110A, 110B converts the training data to transition vectors. According to the present embodiment, the word relationship extraction program 110A, 110B may convert training data 118 to vector space and calculates transition vectors. Word embedding may be performed by a model to produce word embedding, such as "word2vec", dependency-based word embedding, word clustering or other method that converts words, phrases, and sentences from training data 118 to transition vectors. After embedding, each word may have several hundred dimensions. To continue the previous example, the relations "heart:heart attack:bypass" may be converted to 3 transition vectors: the first vector being the difference between the dimensions of "heart:heart attack" ($V(b_1)$) after embedding, the second transition vector being the difference between the dimensions of "heart attack: bypass" ($V(b_2)$) after embedding, and the third vector being the difference between the dimensions of "heart:bypass"

(V(b₃)) after embedding. Additional examples of training data 118 conversion are described with respect to FIG. 2E. At least three transitional vectors may be beneficial in order to use triangulation for candidate answers determination, due to the mathematical relation of V(b₁)+(V(b₂)=V(b₃).

Next, at 206, the word relationship extraction program 110A, 110B smooths the transition vectors. According to the present embodiment, the word relationship extraction program 110A, 110B may apply a smoothing equation that averages examples of similar types of transition vectors from the training data 118 as depicted in FIG. 2C. For example, smoothing of the transition vectors may be calculated by the equation:

$$v(b_2) = v(b_1) + \frac{1}{K}\left(\sum_{k=0}^{K} v(A_{k2}) - v(A_{k1})\right),$$

where v(b₂) is a smoothed transition vector, v(b₁) is a transition vector before smoothing, K is a number of examples, v(A$_{k2}$) is a transition vector determined from example k2, and v(A$_{k1}$) is a transition vector determined from example k1.

Next, at 208, the word relationship extraction program 110A, 110B stores the smoothed transition vector. According to the present embodiment, the word relationship extraction program 110A, 110B may store the smoothed transition vectors in data storage device 106 or database 116. The smoothed transition vectors are stored for use during candidate answers determination that is describe in FIG. 2B below. In another embodiment, the smoothed transition vectors may be transferred for direct determination of candidate answers and not stored for future use.

Figure 2B:
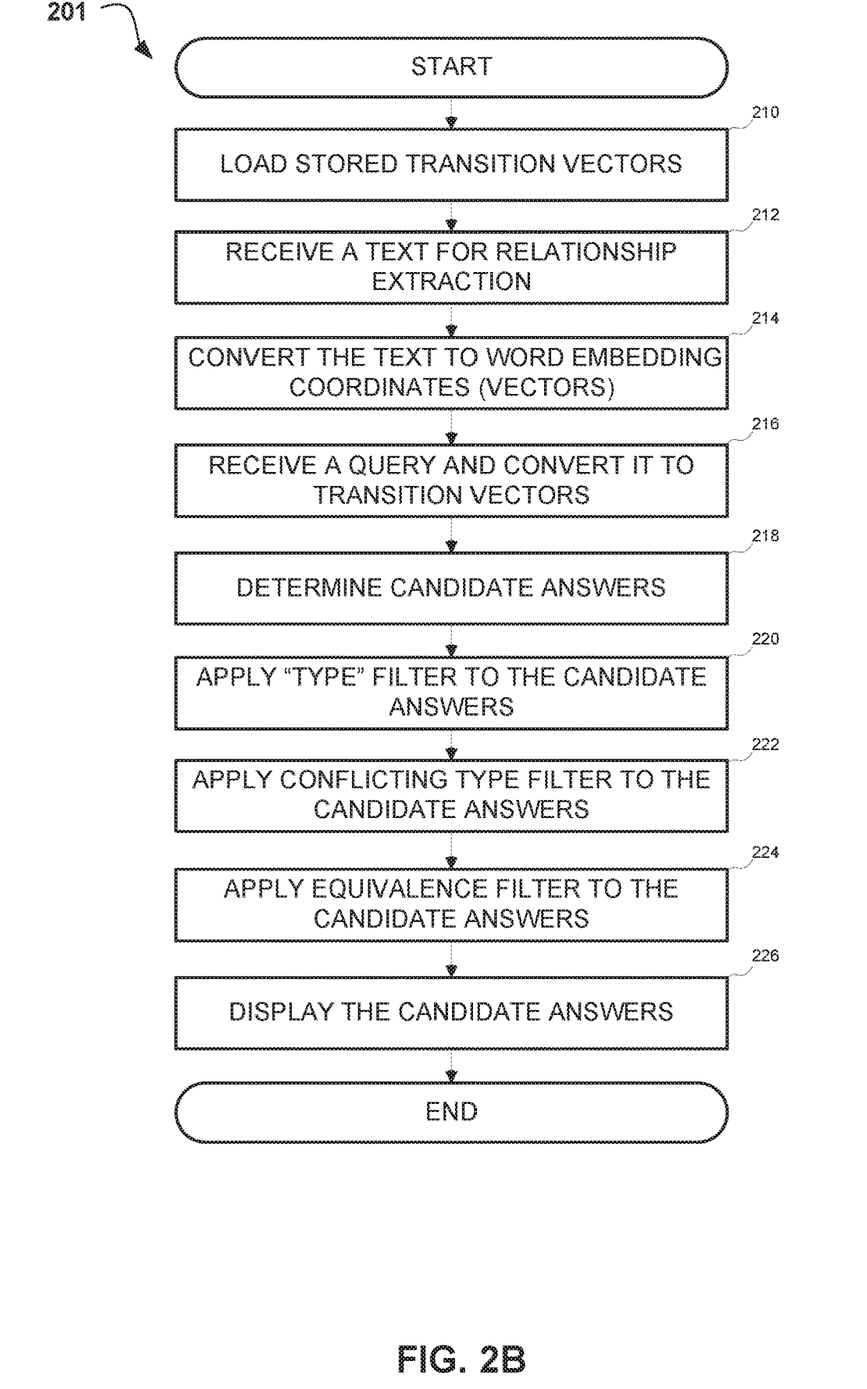
FIG. 2B is an operational flowchart illustrating an answering targeted question process according to at least one embodiment.
Figure 2C:
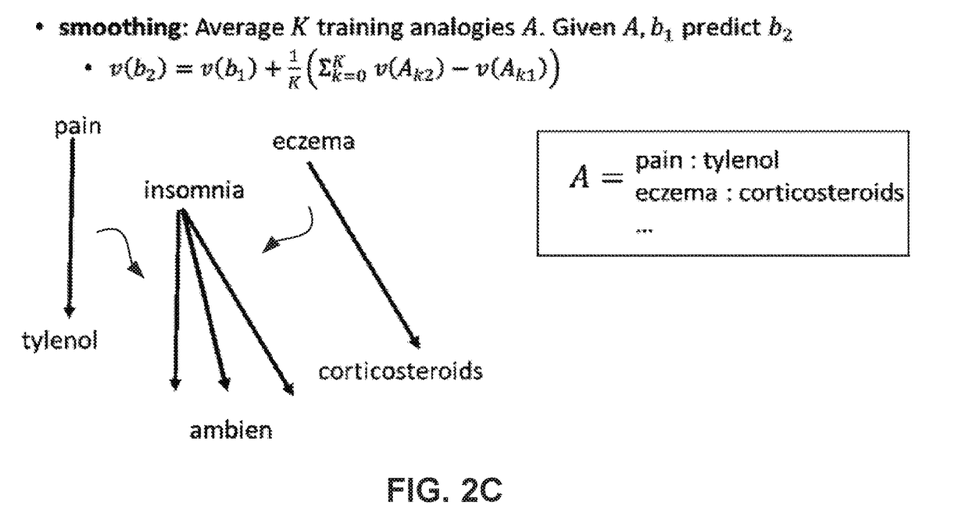
FIGS. 2C-G are example steps of an answering targeted question process according to at least one embodiment.

Referring now to FIG. 2B, an operational flowchart illustrating answering targeted questions process 201 is depicted according to at least one embodiment. Process 201 may be either combined with process 200 as one software application or executed as a standalone process if smoothed transition vectors are stored or otherwise available in data storage device 106 or database 116. At 210, the word relationship extraction program 110A, 110B loads stored transition vectors. According to the present embodiment, the word relationship extraction program 110A, 110B may load training data 118 from in data storage device 106 or database 116.

Figure 3:
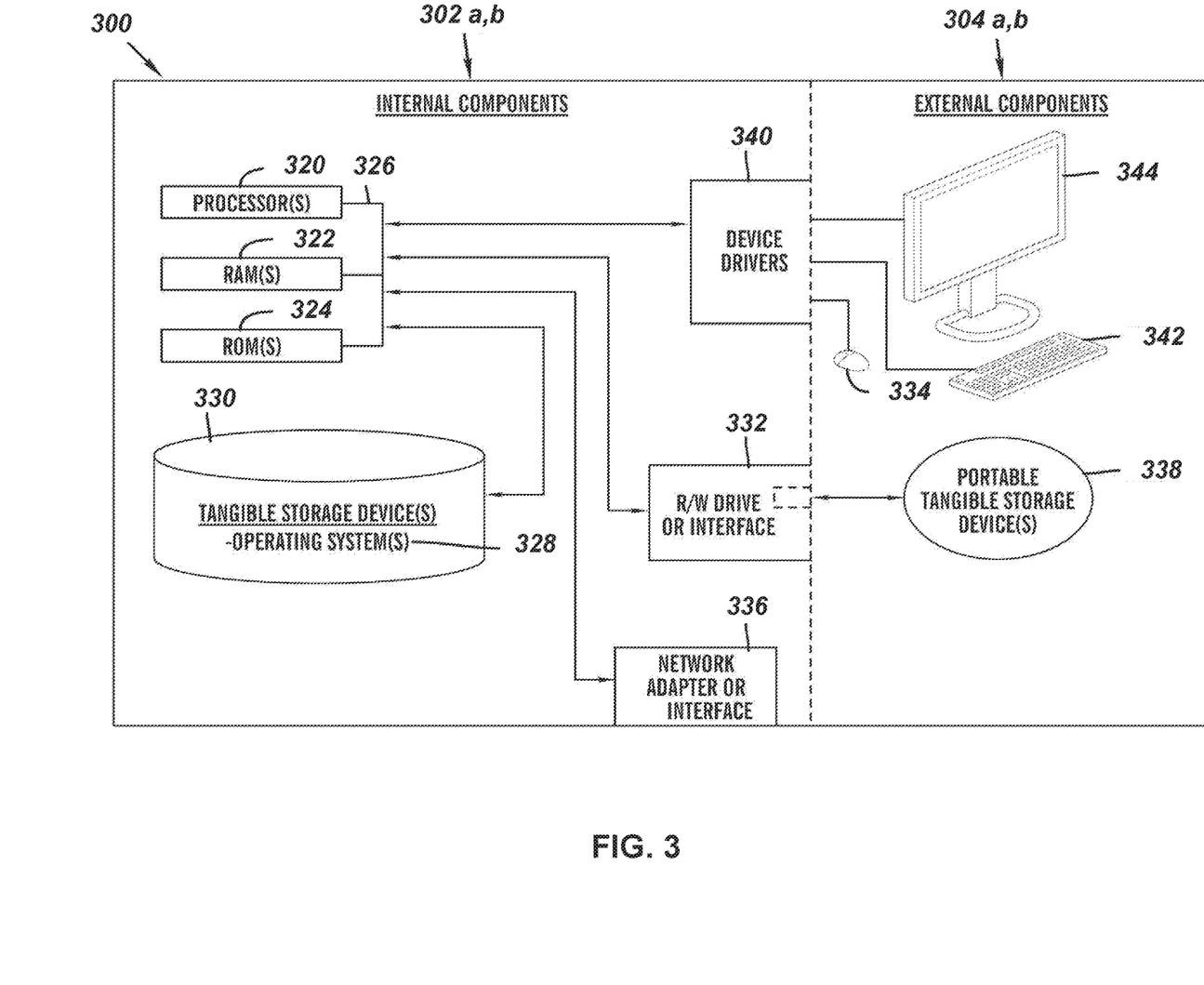
FIG. 3 is a block diagram of internal and external components of computers and servers depicted in FIG. 1 according to at least one embodiment.

Next, at 212, the word relationship extraction program 110A, 110B receives a text for relationship extraction. The text may be any digital document that includes natural language and is capable of being transformed into a word embedding space. The word embedding space may be a set of coordinates of real numbers where each one of coordinates represents words or phrases from the text. According to the present embodiment, the word relationship extraction program 110A, 110B may receive the text either from storage devices, such as data storage device 106, database 116, internal components 302, or external components 304 a,b. For example, a text may be a document that was typed by a user using external components 304 a,b, such as keyboard 342.

Next, at 214, the word relationship extraction program 110A, 110B converts the text to word embedding space where each word or phrase may be represented by a set of coordinates (vector). As previously mentioned, the word relationship extraction program 110A, 110B may convert the text to the word embedding space by using a word embedding model, such as "word2vec", dependency-based word embedding, word clustering, or other method that converts words, phrases and sentences from the loaded text into word embedding space.

Next, at 216, the word relationship extraction program 110A, 110B receives a query and converts the query into a set of coordinates in a word embedding space and a set of corresponding smoothed transition vectors from training data 118. According to the present embodiment, the word relationship extraction program 110A, 110B may receive a query from internal components 302 a,b or external components 304, such as keyboard 442, network adapter or interface 336. The word relationship extraction program 110A, 110B may convert the query into the word-embedded set of coordinates and determine a set of corresponding smoothed transition vectors based on multi-part analogies. To continue the previous example, if the targeted question is "What treats eczema?" the word relationship extraction program 110A, 110B converts "eczema" into a word-embedded set of coordinates and determines smoothed transition vectors from the training data in order to calculate the answer. In the current example, the vectors would be smoothed as V(b₁), V(b₂) and V(b₃), where adding V(b₃) to the set of coordinates determined from "eczema" leads to a field of candidate answers and V(b₁) and V(b₂) may be used for adjusting the field of candidate answers by triangulation.

Next, at 218, the word relationship extraction program 110A, 110B determines candidate answers. According to present embodiment, the word relationship extraction program 110A, 110B may use multi-part analogies to determine the candidate answers using vector mathematics, such as vector triangulation. Multi-part analogies may be utilized as a method of determining precise candidate answers based on a number of analogies (K) of the training data. For example, if the training data included 3 multi-part analogies, such as "heart:heart attack:bypass", and the query asks what treats eczema, the word relationship extraction program 110A, 110B may predict that "eczema" is related to "skin" by vector mathematics (subtracting smoothed vector V(a) from the word-embedded coordinate of "eczema") and use the remaining set of smoothed transition vectors for triangulation in order to determine the candidate answers. After determining the candidate answers, the word relationship extraction program 110A, 110B may determine the relevancy of each candidate answer by for example, applying cosine similarity between the vector pointing to the candidate answer and the smoothed transition vector determined from the set of training data 118 or other known techniques of comparing one or more vectors. In another embodiment, each candidate answer may have a rank attached to the candidate answer that is based on multivariate normal distribution (MVN) that represents the generalization of one dimensional normal distribution to higher dimensions.

Figure 2D:
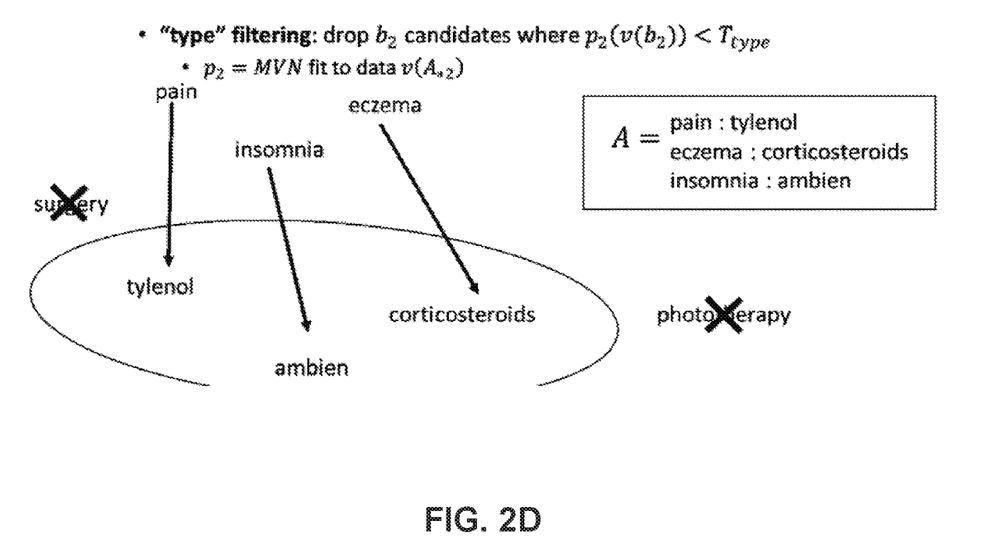
Figure 2E:
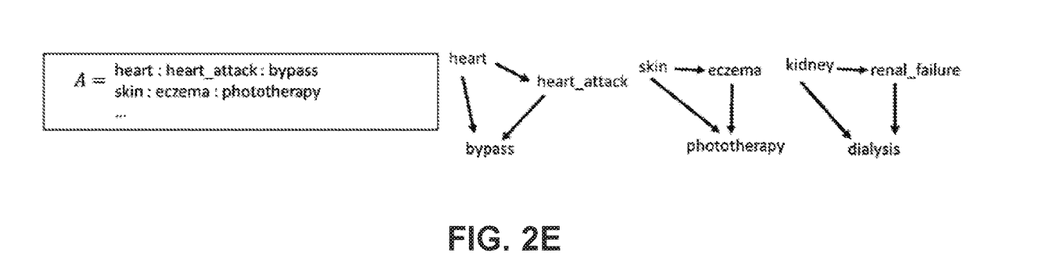

Next, at 220, the word relationship extraction program 110A, 110B applies a "type" filter to the candidate answers. The "type" filter removes the candidate answers that are not within the predicted type subspace and keeps only the candidate answers that are similar to the answers in the training data 118 as depicted in FIG. 2D. The "type" filter is based on an assumption that candidate answers may have a common set of dimensions (coordinates) that locate the candidate answers in a specific subspace in the word embedding space, therefore, all the candidate answers that are not within the subspace should be removed. According to present embodiment, the word relationship extraction program 110A, 110B may apply the "type" filter to the candidate answers using the method of removing $b_2$ candidate answer where:

$$p_2(v(b_2)) < T_{type}, \text{ and } p_2 = MVN \text{ fit to data } v(A_{*2}),$$

where $v(A_{*2})$ represents smoothed transition vectors based on an answer type transition vector from the multi-part analogies training data, and $T_{type}$ is a first threshold value that is determined by the user while calibrating the word relationship extraction program 110A, 110B.

Figure 2F:
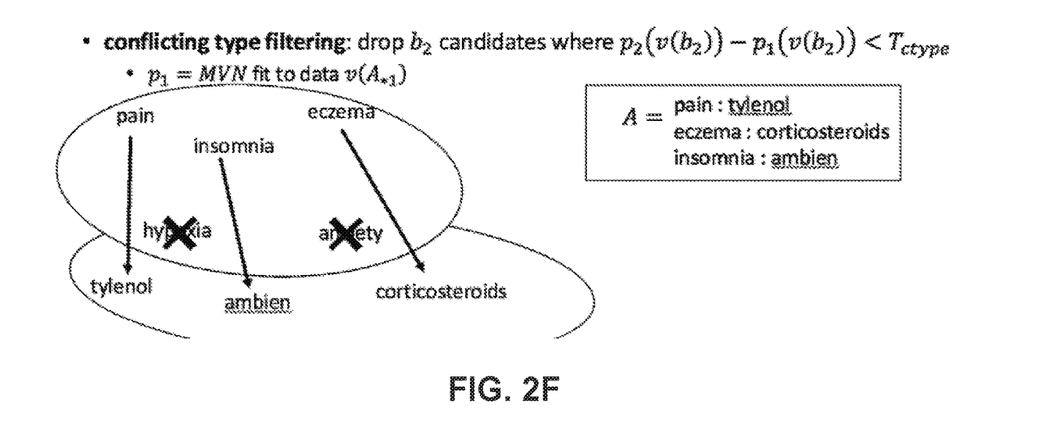

Next, at 222, the word relationship extraction program 110A, 110B applies a conflicting type filter to the candidate answers. A conflicting type filter may eliminate candidate answers that look more like the question than the answer as depicted in FIG. 2F. For example, when word relationship extraction program 110A, 110B processes a targeted question of, "what treats insomnia?" word relationship extraction program 110A, 110B should exclude results such as "insomnia" or "sleeplessness" as a candidate answer. According to the present embodiment, the word relationship extraction program 110A, 110B may apply a conflicting type filter to the candidate answers using the method of removing the $b_2$ candidate answer from:

$$p_2(v(b_2)) - p_1(v(b_2)) < T_{ctype},$$

where p=MVN fit to data $v(A_{*1})$, $v(A_{*1})$ represents smoothed transition vectors based on a transition vector derived from the answer type analogies of the multi-part analogies training data, and $T_{ctype}$ is a second threshold value that is determined by the user while calibrating the word relationship extraction program 110A, 110B.

Figure 2G:
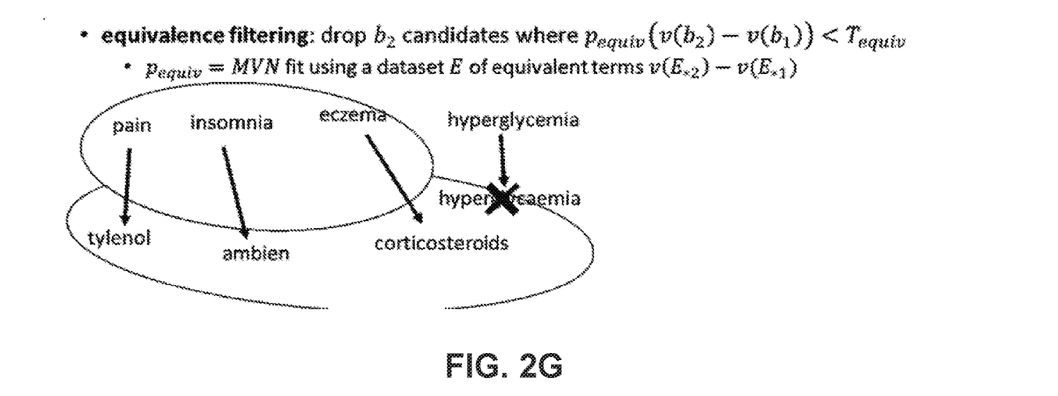

Next, at 224, the word relationship extraction program 110A, 110B applies an equivalence filter to the candidate answers. This type of filtering may remove candidate answers that are restatements of the targeted query itself as depicted in FIG. 2G. According to the present embodiment, the word relationship extraction program 110A, 110B may apply an equivalence filter to the candidate answers using the method of removing the $b_2$ candidate answer where $p_{equiv}(v(b_2) - v(b_1)) < T_{equiv}$, where $$p_{equiv} = MVN \text{ fit using a dataset } E \text{ of equivalent terms}$$
$$v(E_{*2}) - v(E_{*1}),$$

E is a table of equivalent expressions for each word in the training data 118, and $T_{equiv}$ is a third threshold value that is determined by the user while calibrating the word relationship extraction program 110A, 110B.

Next, at 226, the word relationship extraction program 110A, 110B displays the candidate answers. According to the present embodiment, the word relationship extraction program 110A, 110B may display the filtered candidate answers in a text format on a graphical user interface of a display monitor 344. In another embodiment, the filtered candidate answers may be coupled with an MVN number or other ranking representing the accuracy of the candidate answer, such as a ranking based on cosine similarity, a ranking based on MVN distribution, or a ranking based on a combination of cosine similarity and MVN distribution.

The present embodiment, may determine an answer to a targeted question (a given relationship) with a very small number of training examples. Typically, about 40 training examples are required for the process to provide reliable candidate answers. This is in comparison to several thousands of training examples required for alternative machine learning systems designed to identify relationships.

It may be appreciated that FIGS. 2A and 2B provide only an illustration of one implementation and does not imply any limitations with regard to how different embodiments may be implemented. Many modifications to the depicted environments may be made based on design and implementation requirements.

More specifically, the process may be used to chain together a set of smoothed transition vectors based on multi-part analogies to answer complex targeted questions. For example, in order to determine what gene mutations are involved in a specific disease or what population groups are those genetic markers tied to a disease. This is essentially a 4-part analogy that may be converted to transition vectors based on a training data of a format "A:B:C:D" where A is our body system anchor, B is the disease of interest, C is the gene(s) related to the disease, and D is the population group that has a genetic tie to a disease.

FIG. 3 is a block diagram 300 of internal and external components of the client computing device 102 and the server 112 depicted in FIG. 1 in accordance with an embodiment of the present invention. It should be appreciated that FIG. 3 provides only an illustration of one implementation and does not imply any limitations with regard to the environments in which different embodiments may be implemented. Many modifications to the depicted environments may be made based on design and implementation requirements.

The data processing system 302, 304 is representative of any electronic device capable of executing machine-readable program instructions. The data processing system 302, 304 may be representative of a smart phone, a computer system, PDA, or other electronic devices. Examples of computing systems, environments, and/or configurations that may represented by the data processing system 302, 304 include, but are not limited to, personal computer systems, server computer systems, thin clients, thick clients, handheld or laptop devices, multiprocessor systems, microprocessor-based systems, network PCs, minicomputer systems, and distributed cloud computing environments that include any of the above systems or devices.

The client computing device 102 and the server 112 may include respective sets of internal components 302 a,b and external components 304 a,b illustrated in FIG. 3. Each of the sets of internal components 302 a,b include one or more processors 320, one or more computer-readable RAMs 322, and one or more computer-readable ROMs 324 on one or more buses 326, and one or more operating systems 328 and one or more computer-readable tangible storage devices 330. The one or more operating systems 328, the software program 108 and the word relationship extraction program 110A in the client computing device 102, and the word relationship extraction program 110B in the server 112 are stored on one or more of the respective computer-readable tangible storage devices 330 for execution by one or more of the respective processors 320 via one or more of the respective RAMs 322 (which typically include cache memory). In the embodiment illustrated in FIG. 3, each of the computer-readable tangible storage devices 330 is a magnetic disk storage device of an internal hard drive. Alternatively, each of the computer-readable tangible storage devices 330 is a semiconductor storage device such as ROM 324, EPROM, flash memory or any other computer-readable tangible storage device that may store a computer program and digital information.

Each set of internal components 302 a,b also includes a R/W drive or interface 332 to read from and write to one or more portable computer-readable tangible storage devices 338 such as a CD-ROM, DVD, memory stick, magnetic tape, magnetic disk, optical disk or semiconductor storage device. A software program, such as the cognitive screen protection program 110A, 110B, may be stored on one or more of the respective portable computer-readable tangible storage devices 338, read via the respective R/W drive or interface 332, and loaded into the respective hard drive 330.

Each set of internal components 302 a,b may also include network adapters or interfaces 336 such as a TCP/IP adapter cards, wireless Wi-Fi interface cards, or 3G or 4G wireless interface cards or other wired or wireless communication links. The software program 108 and the word relationship extraction program 110A in the client computing device 102 and the word relationship extraction program 110B in the server 112 may be downloaded to the client computing device 102 and the server 112 from an external computer via a network (for example, the Internet, a local area network or other, wide area network) and respective network adapters or interfaces 336. From the network adapters or interfaces 336, the software program 108 and the word relationship extraction program 110A in the client computing device 102 and the word relationship extraction program 110B in the server 112 are loaded into the respective hard drive 330. The network may comprise copper wires, optical fibers, wireless transmission, routers, firewalls, switches, gateway computers and/or edge servers.

Each of the sets of external components 304 a,b may include a computer display monitor 344, a keyboard 342, and a computer mouse 334. External components 304 a,b may also include touch screens, virtual keyboards, touch pads, pointing devices, and other human interface devices. Each of the sets of internal components 302 a,b also includes device drivers 340 to interface to computer display monitor 344, keyboard 342, and computer mouse 334. The device drivers 340, R/W drive or interface 332, and network adapter or interface 336 comprise hardware and software (stored in storage device 330 and/or ROM 324).

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that may be rapidly provisioned and released with minimal management effort or interaction with a provider of the service. This cloud model may include at least five characteristics, at least three service models, and at least four deployment models.

Characteristics are as follows:

On-demand self-service: a cloud consumer may unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities may be rapidly and elastically provisioned, in some cases automatically, to quickly scale out and rapidly released to quickly scale in. To the consumer, the capabilities available for provisioning often appear to be unlimited and may be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage may be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which may include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 4:
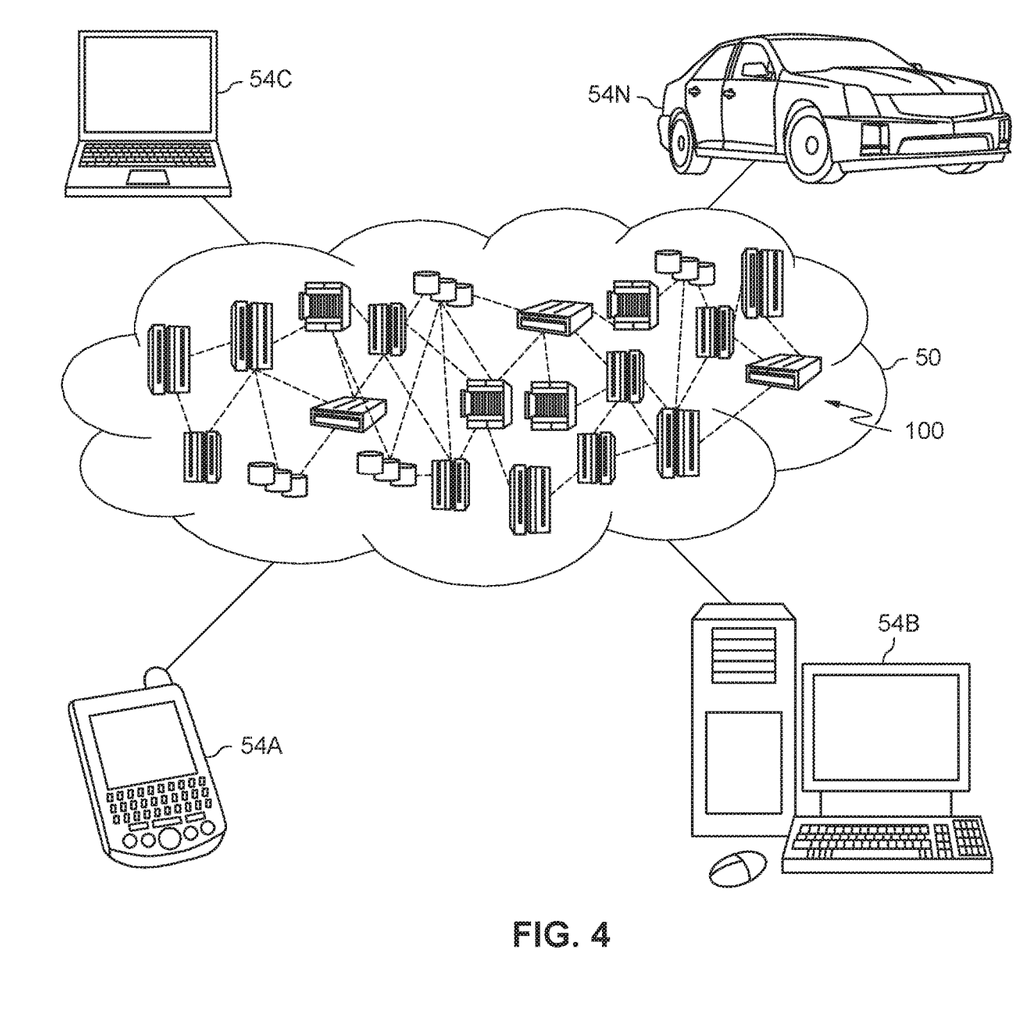
FIG. 4 depicts a cloud computing environment according to an embodiment of the present invention.

Referring now to FIG. 4, illustrative cloud computing environment 50 is depicted. As shown, cloud computing environment 50 comprises one or more cloud computing nodes 100 with which local computing devices used by cloud consumers, such as, for example, personal digital assistant (PDA) or cellular telephone 54A, desktop computer 54B, laptop computer 54C, and/or automobile computer system 54N may communicate. Nodes 100 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 4 are intended to be illustrative only and that computing nodes 100 and cloud computing environment 50 may communicate with any type of computerized device over any type of network and/or network addressable connection (e.g., using a web browser).

Figure 5:
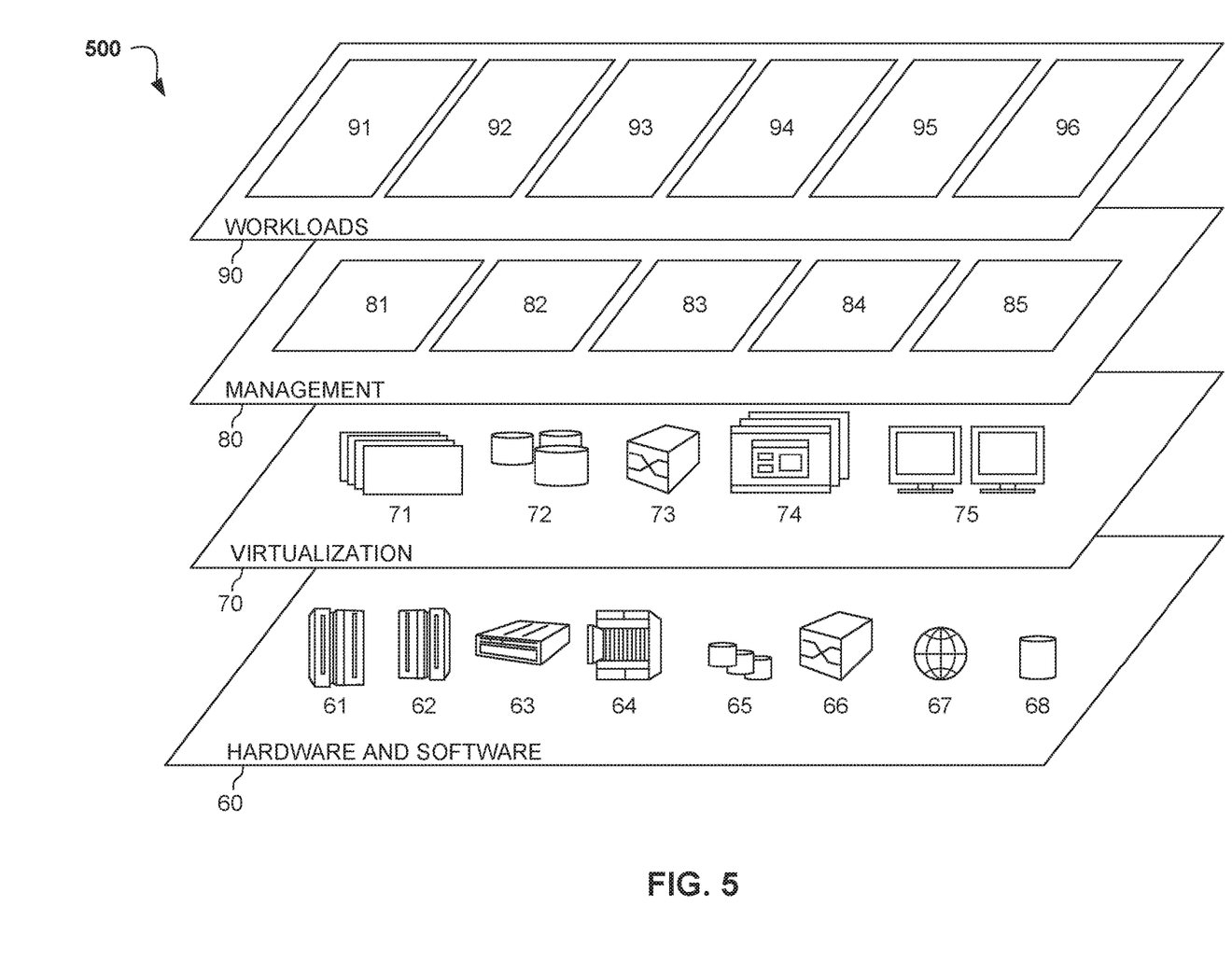
FIG. 5 depicts abstraction model layers according to an embodiment of the present invention.

Referring now to FIG. 5, a set of functional abstraction layers 500 provided by cloud computing environment 50 is shown. It should be understood in advance that the components, layers, and functions shown in FIG. 5 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and word relationship extraction 96. Word relationship extraction 96 may relate to converting training data into smoothed transition vectors, converting text using word embedding, determining candidate answers based on a query transformed to a set of coordinates and a set of smoothed transition vectors, and displaying the candidate answers after applying filters to the candidate answers.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A processor-implemented method for word embedding relationship extraction, the method comprising:
    generating a plurality of smoothed transition vectors from a plurality of training data, wherein the plurality of training data is arranged into a table where each line represents a set of multi part analogies:
    receiving a plurality of text and a query;
    converting the plurality of received text to a word embedding space; converting the received query to a set of coordinates from the word embedding space and a set of the plurality of determined smoothed transition vectors;
    determining a plurality of candidate answers based on adding the set of the smoothed transition vectors to the set of coordinates in the word embedding space, wherein the determining the plurality of candidate answers further comprises: adjusting the plurality of smoothed transition vectors by triangulation; determining a new set of coordinates by applying the adjusted plurality of smoothed transition vectors to the set of coordinates; and converting the determined new set of coordinates to the plurality of candidate answers;
    determining an answer to the received query based on applying a filter, wherein the filter is selected from a group consisting of a type filtering, a conflicting type filtering, and an equivalence filtering; and
    displaying the determined answer.

2. The method of claim 1, wherein determining the plurality of smoothed transition vectors from plurality of training data further comprises:
    converting the plurality of training data to a plurality of transition vectors using a word embedding technique; and
    smoothing the plurality of transition vectors with the plurality of training data.

3. The method of claim 1, wherein converting the plurality of received text to a word embedding space further comprises:
    converting the plurality of received text to a word embedding space by a vectorization of a plurality of words and a plurality of phrases of the plurality of received text to a set of coordinates, wherein each set of coordinates corresponds to the plurality of words and the plurality of phrases.

4. The method of claim 1, wherein applying a type filtering to the plurality of candidate answers further comprises:
   determining a multivariate normal distribution (MVN) value of each of the plurality of candidate answers; and
   removing each candidate answer within the plurality of candidate answers based on the determined MVN value associated with a candidate answer not being within a first threshold value.

5. The method of claim 1, wherein applying a conflicting type filtering to the plurality of candidate answers further comprises:
   determining a multivariate normal distribution (MVN) value of each of the plurality of candidate answers; and
   removing each candidate answer within the plurality of candidate answers based on a difference between the determined MVN value associated with the candidate answer and an MVN value of a transition vector not being within a second threshold value.

6. The method of claim 1, wherein applying an equivalence filtering to the plurality of candidate answers further comprises:
   determining a multivariate normal distribution (MVN) value by calculating a difference between each candidate answer within the plurality of candidate answers and a transition vector; and
   removing each candidate answer within the plurality of candidate answers based on the MVN value of the calculated difference between each candidate answer and the transition vector not being within a third threshold value.

7. A computer system for word embedding relationship extraction, the computer system comprising:
   one or more processors, one or more computer-readable memories, one or more computer-readable tangible storage medium, and program instructions stored on at least one of the one or more tangible storage medium for execution by at least one of the one or more processors via at least one of the one or more memories, wherein the computer system is capable of performing a method comprising:
   generating a plurality of smoothed transition vectors from a plurality of training data, wherein the plurality of training data is arranged into a table where each line represents a set of
   multi part analogies:
   receiving a plurality of text and a query;
   converting the plurality of received text to a word embedding space; converting the received query to a set of coordinates from the word embedding space and a set of the plurality of determined smoothed transition vectors;
   determining a plurality of candidate answers based on adding the set of the smoothed transition vectors to the set of coordinates in the word embedding space, wherein determining the plurality of candidate answers further comprises: adjusting the plurality of smoothed transition vectors by triangulation; determining a new set of coordinates by applying the adjusted plurality of smoothed transition vectors to the set of coordinates; and converting the determined new set of coordinates to the plurality of candidate answers;
   determining an answer to the received query based on applying a filter, wherein the filter is selected from a group consisting of a type filtering, a conflicting type filtering, and an equivalence filtering; and
   displaying the determined answer.

8. The computer system of claim 7, wherein determining the plurality of smoothed transition vectors from plurality of training data further comprises:
   converting the plurality of training data to a plurality of transition vectors using a word embedding technique; and
   smoothing the plurality of transition vectors with the plurality of training data.

9. The computer system of claim 7, wherein converting the plurality of received text to a word embedding space further comprises:
   converting the plurality of received text to a word embedding space by a vectorization of a plurality of words and a plurality of phrases of the plurality of received text to a set of coordinates, wherein each set of coordinates corresponds to the plurality of words and the plurality of phrases.

10. The computer system of claim 7, wherein applying a type filtering to the plurality of candidate answers further comprises:
    determining a multivariate normal distribution (MVN) value of each of the plurality of candidate answers; and
    removing each candidate answer within the plurality of candidate answers based on the determined MVN value associated with a candidate answer not being within a first threshold value.

11. The computer system of claim 7, wherein applying a conflicting type filtering to the plurality of candidate answers further comprises:
    determining a multivariate normal distribution (MVN) value of each of the plurality of candidate answers; and
    removing each candidate answer within the plurality of candidate answers based on a difference between the determined MVN value associated with the candidate answer and an MVN value of a transition vector not being within a second threshold value.

12. The computer system of claim 7, wherein applying an equivalence filtering to the plurality of candidate answers further comprises:
    determining a multivariate normal distribution (MVN) value by calculating a difference between each candidate answer within the plurality of candidate answers and a transition vector; and
    removing each candidate answer within the plurality of candidate answers based on the MVN value of the calculated difference between each candidate answer and the transition vector not being within a third threshold value.

13. A computer program product for word embedding relationship extraction, the computer program product comprising:
    one or more computer-readable tangible storage medium and program instructions stored on at least one of the one or more tangible storage medium, the program instructions executable by a processor, the program instructions comprising:
    program instructions to generate a plurality of smoothed transition vectors from a plurality of training data, wherein the plurality of training data is arranged into a table where each line represents a set of multi part analogies:
    program instructions to receive a plurality of text and a query;

program instructions to convert the plurality of received text to a word embedding space; program instructions to convert the received query to a set of coordinates from the word embedding space and a set of the plurality of determined smoothed transition vectors;

program instructions to determine a plurality of candidate answers based on adding the set of the smoothed transition vectors to the set of coordinates in the word embedding space, wherein program instructions to determine the plurality of candidate answers further comprises: program instructions to adjust the plurality of smoothed transition vectors by triangulation; program instructions to determine a new set of coordinates by applying the adjusted plurality of smoothed transition vectors to the set of coordinates; and program instructions to convert the determined new set of coordinates to the plurality of candidate answers;

program instructions to determine an answer to the received query based on applying a filter, wherein the filter is selected from a group consisting of a type filtering, a conflicting type filtering, and an equivalence filtering; and program instructions to display the determined answer.

14. The computer program product of claim 13, wherein program instructions to determine the plurality of smoothed transition vectors from plurality of training data further comprises:

program instructions to convert the plurality of training data to a plurality of transition vectors using a word embedding technique; and program instructions to smooth the plurality of transition vectors with the plurality of training data.

15. The computer program product of claim 13, wherein program instructions to convert the plurality of received text to a word embedding space further comprises:

program instructions to convert the plurality of received text to a word embedding space by a vectorization of a plurality of words and a plurality of phrases of the plurality of received text to a set of coordinates, wherein each set of coordinates corresponds to the plurality of words and the plurality of phrases.

16. The computer program product of claim 13, wherein program instructions to apply a type filtering to the plurality of candidate answers further comprises:

program instructions to determine a multivariate normal distribution (MVN) value of each of the plurality of candidate answers; and program instructions to remove each candidate answer within the plurality of candidate answers based on the determined MVN value associated with a candidate answer not being within a first threshold value.

17. The computer program product of claim 13, wherein program instructions to apply a conflicting type filtering to the plurality of candidate answers further comprises:

program instructions to determine a multivariate normal distribution (MVN) value of each of the plurality of candidate answers; and program instructions to remove each candidate answer within the plurality of candidate answers based on a difference between the determined MVN value associated with the candidate answer and an MVN value of a transition vector not being within a second threshold value.

* * * * *